United States Patent
Kumar et al.

(10) Patent No.: US 10,885,004 B2
(45) Date of Patent: Jan. 5, 2021

(54) METHOD AND APPARATUS TO MANAGE FLUSH OF AN ATOMIC GROUP OF WRITES TO PERSISTENT MEMORY IN RESPONSE TO AN UNEXPECTED POWER LOSS

(71) Applicant: Intel Corporation, Santa Clara, CA (US)

(72) Inventors: Karthik Kumar, Chandler, AZ (US); Francesc Guim Bernat, Barcelona (ES); Thomas Willhalm, Sandhausen (DE); Mark A. Schmisseur, Phoenix, AZ (US); Benjamin Graniello, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 191 days.

(21) Appl. No.: 16/012,515

(22) Filed: Jun. 19, 2018

(65) Prior Publication Data

US 2019/0384837 A1  Dec. 19, 2019

(51) Int. Cl.
*G06F 12/08* (2016.01)
*G06F 16/22* (2019.01)
*G06F 12/02* (2006.01)
*G06F 11/14* (2006.01)
*G06F 12/0804* (2016.01)
*G06F 16/27* (2019.01)

(52) U.S. Cl.
CPC .......... *G06F 16/22* (2019.01); *G06F 11/1441* (2013.01); *G06F 11/1446* (2013.01); *G06F 12/0238* (2013.01); *G06F 12/0804* (2013.01); *G06F 16/27* (2019.01)

(58) Field of Classification Search
CPC .......... G06F 16/22; G06F 16/27; G06F 16/00; G06F 12/0238; G06F 12/0804; G06F 12/0811; G06F 12/0868; G06F 12/126; G06F 11/1446; G06F 11/1441; G06F 2212/1008; G06F 2212/1032; G06F 2212/205; G06F 2212/311; G06F 2212/465; G06F 2212/214; G06F 9/467; G06F 9/50; G06F 13/16
See application file for complete search history.

(56) References Cited

U.S. PATENT DOCUMENTS

| | | | |
|---|---|---|---|
| 6,279,080 B1 * | 8/2001 | DeRoo | G06F 12/0804 711/135 |
| 6,760,815 B1 * | 7/2004 | Traversat | G06F 9/45504 707/999.202 |
| 2019/0057034 A1 * | 2/2019 | Chew | G06F 12/0831 |
| 2019/0266101 A1 * | 8/2019 | Robinson | G06F 12/1009 |

OTHER PUBLICATIONS

Yoo, et al, "Performance Evaluation of Intel Transactional Synchronization Extensions for High-Performance Computing", SC13, Nov. 17-21, 2013, Denver, CO, USA, 11 pages.

* cited by examiner

*Primary Examiner* — Hiep T Nguyen
(74) *Attorney, Agent, or Firm* — Compass IP Law, PC

(57) ABSTRACT

A group of cache lines in cache may be identified as cache lines not to be flushed to persistent memory until all cache line writes for the group of cache lines have been completed.

18 Claims, 4 Drawing Sheets

METHOD AND APPARATUS TO MANAGE FLUSH OF AN ATOMIC GROUP OF WRITES TO PERSISTENT MEMORY IN RESPONSE TO AN UNEXPECTED POWER LOSS

FIELD

This disclosure relates to persistent memory and in particular to managing flush of an atomic group of writes to persistent memory.

BACKGROUND

A database is an organized collection of data. A relational database is a collection of tables, queries, and other elements. A database-management system (DBMS) is a computer software application that interacts with other computer software applications and the database to capture and analyze data.

A computer system may include a Central Processing Unit (CPU) that typically includes multiple levels of cache memory. A cache is a volatile memory, for example, static random access memory (SRAM) that stores a copy of data that is stored in main memory. Main memory typically includes volatile memory, for example, Dynamic Random Access Memory (DRAM). Volatile memory is memory whose state (and therefore the data stored in it) is indeterminate if power is interrupted to the device. A non-volatile memory (NVM) device is a memory whose state is determinate even if power is interrupted to the device.

In contrast to a traditional database system that stores data on a storage device, for example, a hard disk drive (HDD) or a solid state drive (SSD), an in-memory database (IMDB) system is a database management system that stores data in main memory. The main memory may be non-volatile memory. An IMDB provides extremely high queries/second to support rapid decision making based on real-time analytics.

If power is unexpectedly interrupted to the system, data that is in process to be written to the in-memory database in non-volatile memory that is stored in a volatile memory, for example, in cache in the CPU may be lost.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
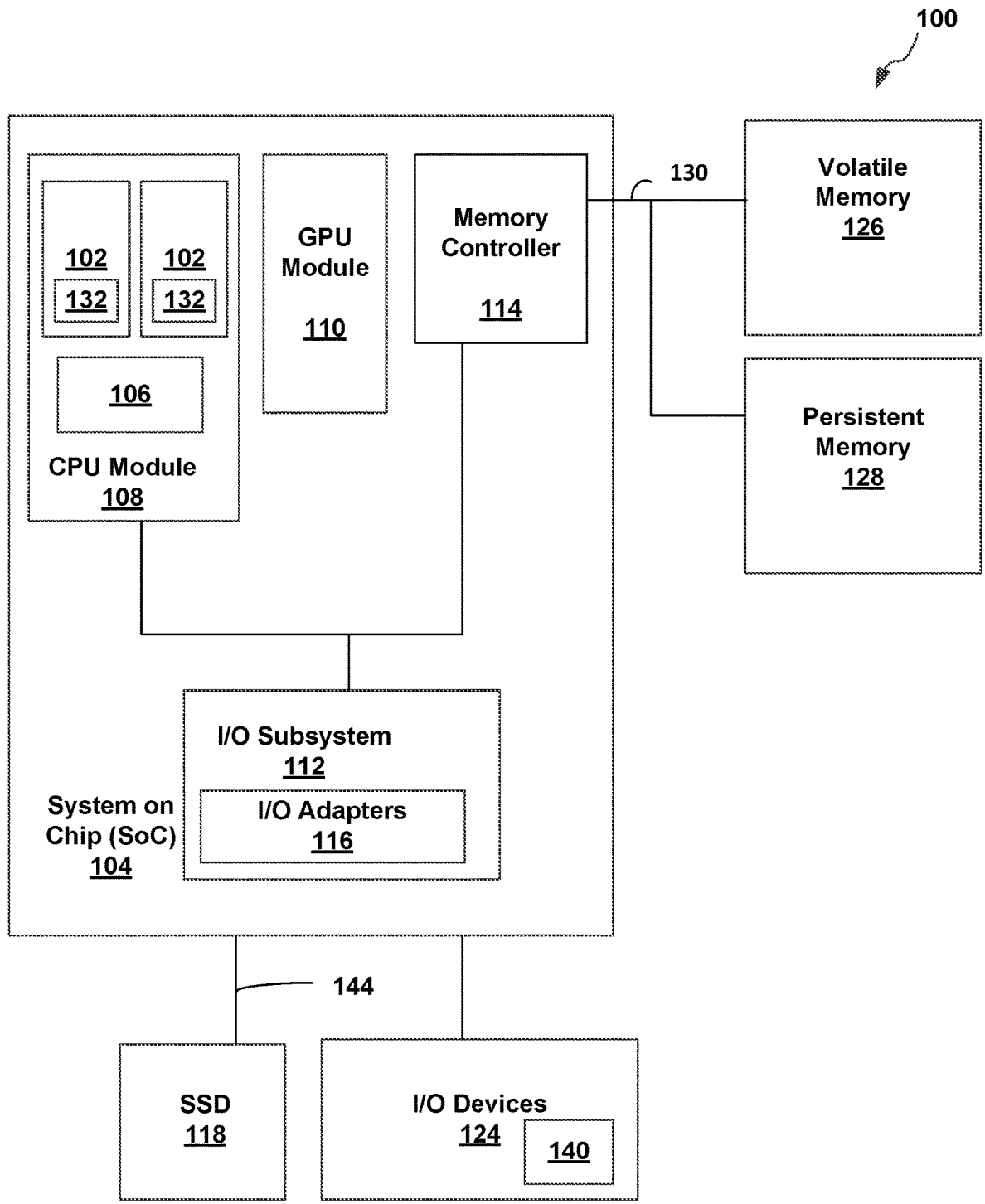
FIG. 1 is a block diagram of an embodiment a computer system that includes a processor core to commit a group of writes together from processor cache to persistent memory.

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

Asynchronous DRAM self-refresh (ADR) is a platform-level feature where the power supply signals a Platform Control Hub (PCH) that power-fail is imminent. The PCH propagates the power fail notification to the CPU. Internal units within the CPU ultimately signal the internal memory controller causing it to flush Write Pending Queues in the memory subsystem to non-volatile memory. The non-volatile memory may be persistent memory, a write-in-place byte addressable non-volatile memory.

A power-fail protected system with ADR Asynchronous DRAM self-refresh (ADR) or enhanced Asynchronous DRAM self-Refresh (eADR) may have sufficient backup power to write all data stored in volatile memory (which may include memory controller queues, processor caches and write data in buffers in the I/O controller) to persistent memory in the computer system if power is interrupted to the system. For example, the CPU may execute instructions such as, Cache Line Write Back (CLWB), Cache Line Flush (CLFLUSH) and Cache Line Flush Optimal (CLFLUSHOPT) to flush the data from the volatile cache in the CPU when power is interrupted to the system. The CLWB instruction writes the value stored in cache to persistent memory and also leaves the value in the cache to perform the next access to cache. The CLFLUSHOPT instruction flushes the cache line and allows concurrency.

However, there are scenarios in which there is a need to commit a group of writes together to persistent memory, for example, "all or nothing commits". For example, if an application is in the process of updating a record in an in-memory database stored in persistent memory for a "preferred contact" that includes fields for a name, phone number, and email address, all fields must be updated together in the persistent memory when the "preferred contact" entry is updated. Having just one field, for example, the name field updated with a power failure occurring at that time results in a mismatched phone number and email address in the record for the "preferred contact" that is stored in persistent memory.

In an embodiment, a group of cache lines in cache may be identified as cache lines not to be flushed to persistent memory until all cache line writes for the group of cache lines have been completed. The group of cache lines may be referred to as an atomic group of writes. A group of writes is atomic, such that if all writes cannot be executed successfully, none of the writes in the group are executed.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

FIG. 1 is a block diagram of an embodiment of a computer system 100 that includes a processor core to commit a group of writes together from processor cache to persistent memory. Computer system 100 may correspond to a computing device including, but not limited to, a server, a workstation computer, a desktop computer, a laptop computer, and/or a tablet computer.

The computer system 100 includes a system on chip (SOC or SoC) 104 which combines processor, graphics, memory, and Input/Output (I/O) control logic into one SoC package. The SoC 104 includes at least one Central Processing Unit (CPU) compute complex 108, a memory controller 114, and a Graphics Processor Unit (GPU) 110. In other embodiments, the memory controller 114 may be external to the SoC 104.

In the embodiment shown in FIG. 1, the CPU compute complex 108 includes two processors also referred to as processor cores ("cores") 102, and a level 2 (L2) cache 106 that is shared by the processor cores 102 in the CPU compute complex 108. Each core 102 includes a level 1 (L1) cache 132. In other embodiments the CPU compute complex 108 may have more than two processor cores 102 and each processor core 102 may have a level 2 cache 106. The level 1 cache 132 and level 2 cache 106 is used by the processor cores 102 to reduce the time to access data from external memory in the computer system 100. The level 1 cache 132 and level 2 cache 106 store a copy of data from frequently used memory locations in volatile memory 126 and persistent memory 128. The level 1 cache 132 may include a data cache to store data and an instruction cache to store instructions.

Although not shown, each of the processor core(s) 102 may internally include execution units, prefetch buffers, instruction queues, branch address calculation units, instruction decoders, floating point units, retirement units, etc. The CPU compute complex 108 may correspond to a single core or a multi-core general purpose processor, such as those provided by Intel® Corporation, according to one embodiment.

The memory controller 114 may be coupled to a persistent memory 128 and a volatile memory 126 via a memory bus 130, for example, Gen-Z (genzconsortium.org), Open CAPI (opencapi.org), CCIX (ccixconsortium.com) or other differential interface technologies. A persistent memory 128 is a write-in-place byte addressable non-volatile memory. The persistent memory 128 can include a byte-addressable write-in-place three dimensional cross point memory device, or other byte addressable write-in-place NVM devices such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other non-volatile memory.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein may be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The I/O adapters 116 may include a Peripheral Component Interconnect Express (PCIe) adapter that is communicatively coupled using the NVMe (NVM Express) over PCIe (Peripheral Component Interconnect Express) protocol over bus 144 to a host interface in the SSD 118. Non-Volatile Memory Express (NVMe) standards define a register level interface for host software to communicate with a non-volatile memory subsystem (for example, a Solid-state Drive (SSD)) over Peripheral Component Interconnect Express (PCIe), a high-speed serial computer expansion bus. The NVM Express standards are available at www.nvmexpress.org. The PCIe standards are available at www.pcisig.com.

The Graphics Processor Unit (GPU) 110 may include one or more GPU cores and a GPU cache which may store graphics related data for the GPU core. The GPU core may internally include one or more execution units and one or more instruction and data caches. Additionally, the Graphics Processor Unit (GPU) 110 may contain other graphics logic units that are not shown in FIG. 1, such as one or more vertex processing units, rasterization units, media processing units, and codecs.

Within the I/O subsystem 112, one or more I/O adapter(s) 116 are present to translate a host communication protocol utilized within the processor core(s) 102 to a protocol compatible with particular I/O devices. Some of the protocols that adapters may be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 116 may communicate with external I/O devices 124 which may include, for example, user interface device(s) including a display and/or a touch-screen display 140, printer, keypad, keyboard, communication logic, wired and/or wireless, storage device(s) including hard disk drives ("HDD"), solid-state drives ("SSD") 118, removable storage media, Digital Video Disk (DVD) drive, Compact Disk (CD) drive, Redundant Array of Independent Disks (RAID), tape drive or other storage device. The storage devices may be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)).

Additionally, there may be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

Figure 2:
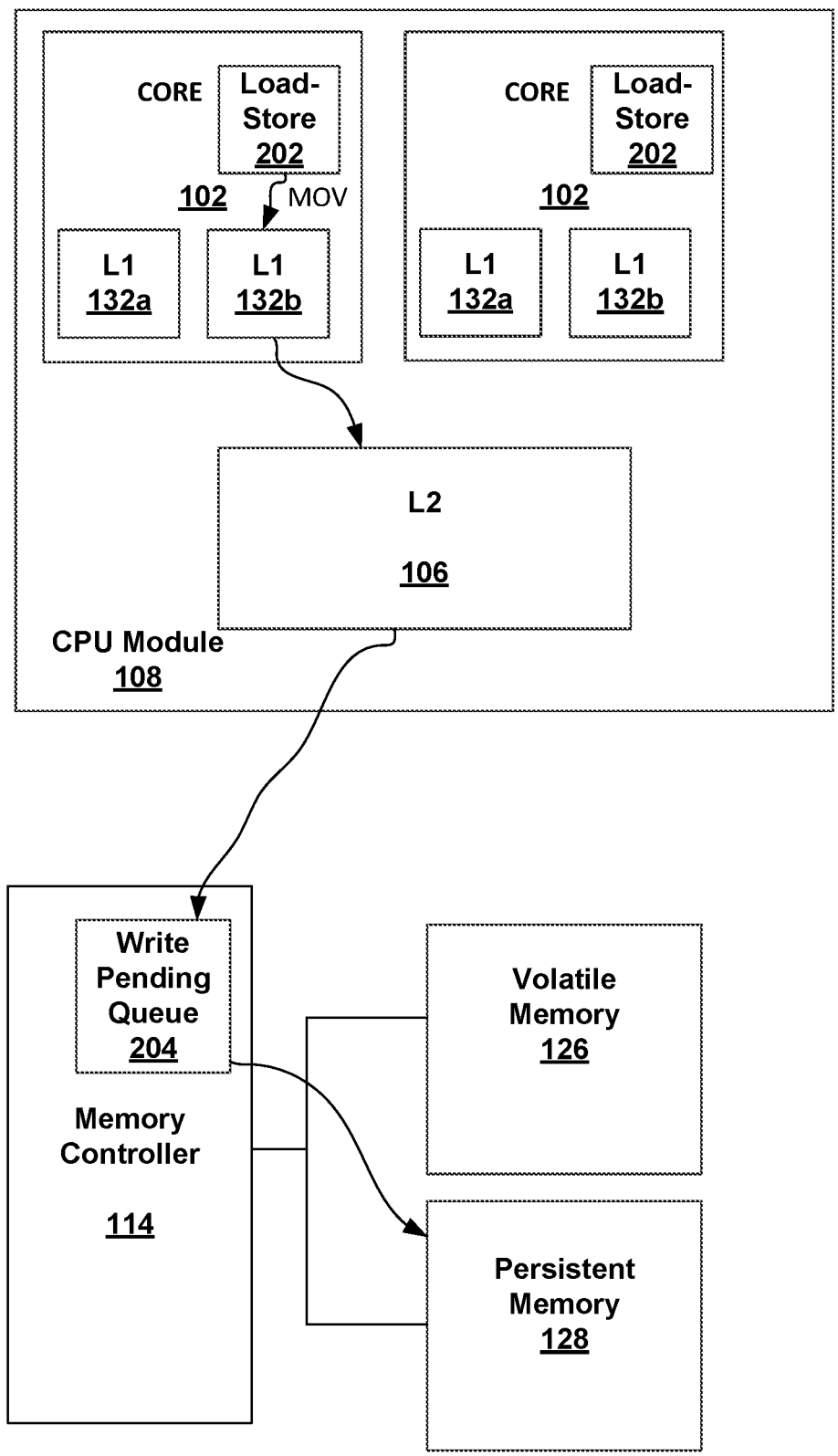
FIG. 2 illustrates the data path taken by an instruction to store data (for example, a MOV instruction) to persistent memory through the memory hierarchy in the system shown in FIG. 1.

FIG. 2 illustrates the data path taken by an instruction to store data (for example, a MOV instruction) to persistent memory 128 through the memory hierarchy in the system shown in FIG. 1. As discussed in conjunction with FIG. 1, each core 102 includes a L1 cache 132 that includes a L1 instruction cache 132a and a L1 data cache 132b. In the embodiment shown each core 102 shares a L2 cache 106 with other cores 102. In other embodiments, each core 102 may include a L2 cache 106 and share a level 3 (L3) cache. Data is transferred between memory (persistent memory 128 and volatile memory 126) and cache (level 1 cache 132 and level 2 cache 106) in blocks of fixed size, called cache lines or cache blocks.

When a load/store execution unit 202 in the core 102 executes a store instruction (for example, a MOV instruction) to store data (write data) in a location in persistent memory 128, the core 102 first checks for a corresponding cache entry in the L1 data cache 132b. If the memory location is in a cache entry in the L1 data cache 132a, a cache hit has occurred. In the case of a cache hit, the core 102 immediately writes the data in the cache line in the L1 data cache 132a.

If the core 102 does not find a cache entry in the L1 data cache 132b corresponding to the memory location in persistent memory 128, a cache miss has occurred. For a cache miss, a new cache entry is allocated in the L1 data cache 132b and data to be written to the memory location in the persistent memory 128 is stored in the new entry in the L1 data cache 132b.

The memory controller 114 coupled to the CPU module writes data stored in Level 1 data cache 132b and level 2 cache 106 to persistent memory 128. When a store instruction (for example, a MOV instruction) is executed to store data in memory, the data to be stored is typically stored in L1 data cache 132b or L2 cache 106 in the CPU 108. A write instruction, for example, Cache Line Write Back (CLWB) can be executed to flush the data from the L1 data cache 132b and L2 cache 106 in the CPU 108. After the data to be stored has been flushed from the L1 data cache 132b and the L2 cache 106, the data may be stored in a write pending queue (WPQ) 204 in the memory controller 114. The data stored in L1 data cache 132b and L2 cache 106 may also be flushed to persistent memory in the event of a power failure using a platform-level feature called Asynchronous DRAM Refresh (ADR). The WPQ 204 may also be flushed using a kernel-only WPQ flush command to ensure that data is immediately flushed to persistent memory.

Figure 3:
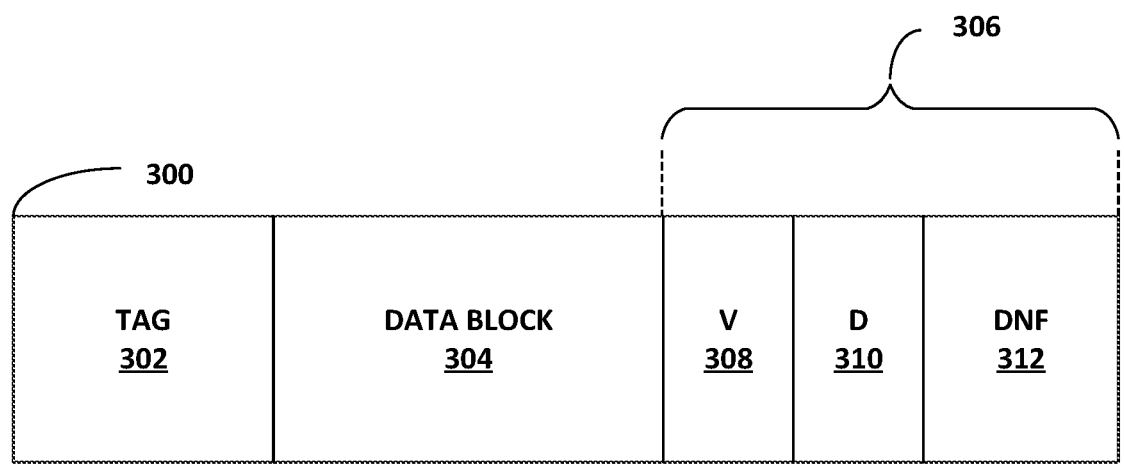
FIG. 3 is a block diagram illustrating a cache entry in L1 data cache 132b shown in FIG. 2.

FIG. 3 is a block diagram illustrating a cache entry 300 in L1 data cache 132b shown in FIG. 2. The cache entry 300 is allocated in L1 data cache 132b when a cache line is copied from persistent memory 128 to the L1 data cache 132b. The cache entry 300 stores a copy of the data stored in persistent memory 128 (cache line) in a data block field 304. The cache entry 300 also includes a tag field 302, and a flag field 306. A tag stored in the tag field 302 includes a portion of the persistent memory address associated with the cache line. The flag field 306 stores metadata that includes a valid bit ('V') 308, a dirty bit ('D') 310, and a Do Not Flush bit ('DNF') 312. If the dirty bit 310 is set, the associated cache line in the L1 data cache 132b has been written by the core 102 since the cache line was read from persistent memory 128.

Figure 4:
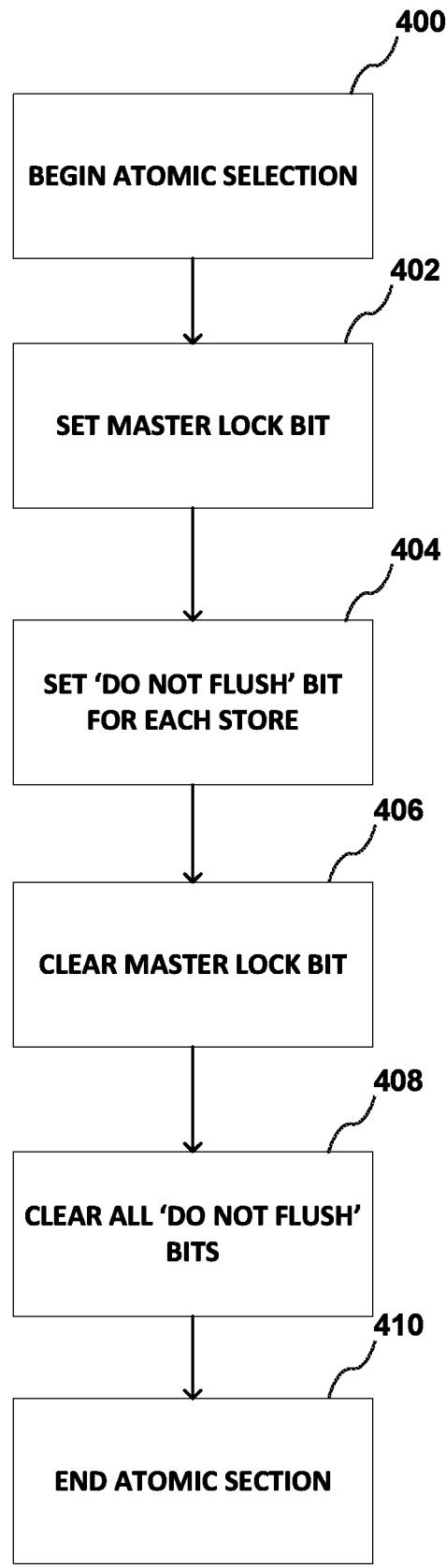
FIG. 4 is a flowgraph of a method performed by any of the cores shown in FIG. 2 to commit a group of writes in cache to persistent memory.

FIG. 4 is a flowgraph of a method performed by any of the cores 102 shown in FIG. 2 to commit a group of writes in cache to persistent memory. The group of writes may be referred to as an atomic group of writes, an atomic region, a critical section or an atomic section.

In an embodiment, the size of the atomic region or atomic section ('S') is within (that is, less than or equal to) the size of the L1 cache. An L1 cache may be about 20 KiloBytes (KB) and is private to each core. The atomic section is implemented in each L1 cache on a "per-thread" basis.

Typically, an atomic region or atomic section in a software application is less than the size of the L cache. A BEGIN_GROUP_COMMIT instruction may be used to specify a start of the atomic region and an END_GROUP_COMMIT instruction to specify the end of the atomic region. The BEGIN_GROUP_COMMIT instruction may take an operand that provides a relative offset to a fallback instruction address if the atomic region cannot be successfully committed. Prior to executing the BEGIN_GROUP_COMMIT instruction, the Do Not Flush bit ('DNF') 312 in each cacheline in the L1 cache is clear (for example, set to logical '0').

At block 400, a BEGIN_GROUP_COMMIT instruction indicating that a group of writes are to be written together to a persistent memory is executed by the core 102.

Processing continues with block 402.

At block 402, in response to the BEGIN_GROUP_COMMIT instruction a master lock bit is set (for example, set to logical '1') indicating that cache lines in the L1 data cache 132b that are marked "do not flush" (for example, the Do Not Flush bit ('DNF') 312 is set to logical '1') are not to be written to persistent memory 128. The master lock bit may be a reserved bit in a register in the core and may be referred to as a 'do not flush" lock. A cache line in the L1 data cache 132b is marked "do not flush" by setting the "do not flush" bit 312 (for example, set to logical '1'). If a power failure occurs at this time, all cache lines are written to persistent memory because the "do not flush" bit 312 is not set in any of the cache lines in the L1 data cache 132b. Processing continues with block 404.

At block 404, for each store instruction executed by the load and store execution unit 202 in the core 102, the data is initially stored in a cache line 300 in the L1 data cache 132b. In addition to data, each cache line 300 in the L1 data cache 132b stores metadata (for example, flag bits 306 shown in FIG. 3). In an embodiment, one bit of the metadata which may be referred to as a "non-flushable" bit or a "do not flush" bit 312 is reserved to indicate whether the cache line 300 can be flushed to persistent memory 128. The "do not flush" bit 312 acts as a tracking mechanism to mark a cache line that is part of a group commit to persistent memory 128, as a cache line that is not to be flushed upon a power failure.

In addition to marking each cache line that is part of a group commit to persistent memory, a Read For Ownership (RFO) operation is not permitted in the middle of an atomic section. A RFO is an operation in cache coherency protocols. The RFO operation fetches the latest available version of data corresponding to that address into the processor cache. The fetch may be from main memory (DRAM) or persistent memory or from a private cache in another core. The fetch typically occurs from another core's cache if the same address was just written to by the other core and was not yet flushed out from that core's cache so that the latest version of data is in the other core's private cache.

The default state for the "do not flush" bit 312 is clear (for example, a logical '0'), that is, flush the cache line upon a power failure. The master lock bit serves as a lock for the "do not flush" bits 312 in a L1 data cache in the core. While the master lock is set, the "do not flush" bit is set (for example set to logical '1') in each cache line in which data is stored. If a power failure occurs at this time, none of the stores to L1 cache since the BEGIN_GROUP_COMMIT processor instruction was executed will be flushed to persistent memory 128. Processing continues with block 406.

At block 406, in response to an END_GROUP_COMMIT instruction executed by the core 102, the master lock bit is cleared (for example, set to '0') to indicate that the data for group of writes to be committed together has been stored in the L1 data cache 132b. If a power failure occurs at this time, all cache lines 300 in the L1 data cache 132b are written to persistent memory 128 even the cache lines 300 with the "do not flush" bit 312 set because the master lock bit is cleared and the state of the "do not flush" bit 312 in for each cache line in L1 data cache 132b is ignored. The master lock bit is used so that clearing each "do not flush" bit 312 at the end of a group commit is atomic. Processing continues with block 408.

At block 408, the "do not flush" bits 312 that are set for cache lines 300 in the L1 data cache 132b are cleared (for example, set to logical '0'). Processing continues with block 410.

At block 410, the data stored in the data block 304 in cache lines 300 is written to persistent memory 128 and the cache lines 300 in the L1 data cache 132b may be used to store other data. Processing is complete.

An embodiment has been described in which the size of the atomic region is within the size of the L1 data cache 132b. If the size of the atomic region is greater than the size of the L1 data cache 132b, instead of performing the atomic flush as described in conjunction with FIG. 4, an undo log or redo log may be stored in another region of persistent memory 128 to undo or redo the writes to the persistent memory 128, if there is a power failure during an atomic group commit. To undo the writes, a shadow copy of the original data is stored in persistent memory 128, so that if there is a power failure during an atomic group commit, the shadow copy is retrieved. To redo the writes, the group commit data is written to another location in persistent memory 128 (write-ahead) so that if the power failure occurs during the atomic group commit, the data write can resume after power is restored from the other persistent location and the atomic group commit can be completed.

If the size of the atomic region is within the size of the L1 data cache 132b and a cache line is evicted due to a conflict, the transaction is aborted and instead of performing the atomic flush, the undo log or redo log is used as described earlier.

In another embodiment, the size of the atomic region may be within the size of the cache hierarchy instead of just within the first level cache in the cache hierarchy (L1 data cache 132b). In one embodiment, the cache hierarchy includes the L1 data cache 1132b and L2 cache 106 in the core 102. In another embodiment, in addition to L1 data cache 132b and L2 cache 106 in the core 102, the cache hierarchy includes external DRAM cache (for example, volatile memory 126).

In a cache hierarchy with multi-level caches, if all blocks in the higher level cache are also present in the lower level cache, the lower level cache is inclusive of the higher level cache. If the lower level cache contains blocks that are not present in the higher level cache, the lower level cache is exclusive of the higher level cache.

In an exclusive cache hierarchy, there is only one copy of the data between all levels, that is L1, L2, and L3 (last level cache (LLC)). The 'do not flush' bits are inherited when a cache line is evicted from one cache level to another cache level in the cache hierarchy.

In an inclusive cache hierarchy, each level below any given level has the same copy of the data, that is, the last level (which has the largest capacity) stores a superset of the data stored in the L1 and L2 caches. Likewise, L2 is a superset of L1. Given this duplication in an inclusive cache hierarchy, only the "last cache level" (L2 or L3) in the cache hierarchy has 'do not flush' bits.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A processor comprising:
a cache comprising at least one cache line; and
a core coupled to the cache, the core comprising:
an execution unit, the execution unit to set a lock in response to executing a first instruction, the lock to mark a group of cache lines in the cache not to be flushed to a persistent memory until all cache line writes for the group of cache lines have been completed, the persistent memory coupled to the processor, the execution unit to store data to be written to the persistent memory to a cache line in the group of cache lines and to set a bit in the cache line to prevent a flush of the cache line to the persistent memory in an event of a power failure while the lock is set.

2. The processor of claim 1, wherein the first instruction to mark a beginning of the group of cache lines that are part of a group commit to the persistent memory.

3. The processor of claim 1, wherein a Read For Ownership (RFO) operation is not permitted in the group of cache lines.

4. The processor of claim 2, wherein the execution unit to clear the lock for the group of cache lines in response to executing a second instruction after data has been stored in all cache lines in the group of cache lines.

5. The processor of claim 4, wherein the second instruction to mark an end of the group commit.

6. The processor of claim 5, wherein the execution unit to clear the bit in each cache line in the group of cache lines after the lock has been cleared.

7. A system comprising:
a persistent memory; and
a processor coupled to the persistent memory, the processor comprising:
a cache comprising at least one cache line; and
a core coupled to the cache, the core comprising:
an execution unit, the execution unit to set a lock in response to executing a first instruction, the lock to mark a group of cache lines in the cache not to be flushed to the persistent memory until all cache line writes for the group of cache lines have been completed, the execution unit to store data to be written to the persistent memory to a cache line in the group of cache lines and to set a bit in the cache line to prevent a flush of the cache line to the persistent memory in an event of a power failure while the lock is set.

8. The system of claim 7, wherein the first instruction to mark a beginning of the group of cache lines that are part of a group commit to the persistent memory.

9. The system of claim 7, wherein a Read For Ownership (RFO) operation is not permitted in the group of cache lines.

10. The system of claim 8, wherein the execution unit to clear the lock for the group of cache lines in response to executing a second instruction after data has been stored in all cache lines in the group of cache lines.

11. The system of claim 10, wherein the second instruction to mark an end of the group commit.

12. The system of claim 11, wherein the execution unit to clear the bit in each cache line in the group of cache lines after the lock has been cleared.

13. A method comprising:
storing data to be written to a persistent memory in a cache line in a cache in a processor;
executing a first instruction, by an execution unit in a core in the processor, to set a lock to mark a group of cache lines in the cache not to be flushed to the persistent memory until all cache line writes for the group of cache lines have been completed; and
storing data to be written to the persistent memory to a cache line in the group of cache lines and setting a bit in the cache line to prevent a flush of the cache line to the persistent memory in an event of a power failure while the lock is set.

14. The method of claim 13, wherein the first instruction to mark a beginning of the group of cache lines that are part of a group commit to the persistent memory.

15. The method of claim 13, wherein a Read For Ownership (RFO) operation is not permitted in the group of cache lines.

16. The method of claim 14, further comprising:
clearing the lock for the group of cache lines in response to executing a second instruction after data has been stored in all cache lines in the group of cache lines.

17. The method of claim 16, wherein the second instruction to mark an end of the group commit.

18. The method of claim 17, further comprising:
clearing the bit in each cache line in the group of cache lines after the lock has been cleared.

* * * * *